United States Patent
Nomura

(10) Patent No.: US 12,538,009 B2
(45) Date of Patent: Jan. 27, 2026

(54) IMAGE PROCESSING METHOD, RECORDING MEDIUM, IMAGE PROCESSING APPARATUS, AND IMAGE-CAPTURING APPARATUS WHICH FIRST DETECTS A REGION OF A PERSON AND THEN DETECTS A STATE OF THE PERSON

(71) Applicant: Kenichiroh Nomura, Tokyo (JP)

(72) Inventor: Kenichiroh Nomura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 260 days.

(21) Appl. No.: 18/275,626

(22) PCT Filed: Feb. 21, 2022

(86) PCT No.: PCT/IB2022/051503
§ 371 (c)(1),
(2) Date: Aug. 3, 2023

(87) PCT Pub. No.: WO2022/195375
PCT Pub. Date: Sep. 22, 2022

(65) Prior Publication Data
US 2024/0089580 A1    Mar. 14, 2024

(30) Foreign Application Priority Data
Mar. 17, 2021   (JP) .................................. 2021-043464

(51) Int. Cl.
*H04N 23/611*    (2023.01)
*G06T 7/60*    (2017.01)
(Continued)

(52) U.S. Cl.
CPC ............. *H04N 23/611* (2023.01); *G06T 7/60* (2013.01); *G06T 7/74* (2017.01); *G06V 10/22* (2022.01);
(Continued)

(58) Field of Classification Search
CPC ..................................................... G06V 10/147
See application file for complete search history.

(56) References Cited

U.S. PATENT DOCUMENTS 10,027,888 B1 * 7/2018 Mackraz ................ G06V 10/25
12,322,075 B2 * 6/2025 Miles ........................ G06T 3/12
(Continued)

FOREIGN PATENT DOCUMENTS

CN       105872354 A    8/2016
JP       2001-051338 A    2/2001
(Continued)

OTHER PUBLICATIONS

International Search Report and Written Opinion issued on May 30, 2022 in PCT/IB2022/051503 filed on Feb. 21, 2022, 10 pages.
(Continued)

*Primary Examiner* — Cynthia Segura
(74) *Attorney, Agent, or Firm* — XSENSUS LLP

(57) ABSTRACT

An image processing method includes acquiring an image; identifying a position of a region of a person in the acquired image; setting an object detection range based on the identified position of the region of the person; and detecting a state of the person based on the set object detection range.

12 Claims, 15 Drawing Sheets

(51) Int. Cl.
  *G06T 7/73* (2017.01)
  *G06V 10/22* (2022.01)
  *G06V 40/10* (2022.01)
  *G06V 40/16* (2022.01)
  *G06V 40/20* (2022.01)

(52) U.S. Cl.
  CPC ............ *G06V 40/103* (2022.01); *G06V 40/16* (2022.01); *G06V 40/20* (2022.01); *G06T 2207/30201* (2013.01)

(56) References Cited

U.S. PATENT DOCUMENTS

| | | |
|---|---|---|
| 2005/0151837 A1 | 7/2005 | Cutler |
| 2010/0208099 A1 | 8/2010 | Nomura |
| 2010/0231746 A1 | 9/2010 | Nomura |
| 2014/0071227 A1 | 3/2014 | Takenaka et al. |
| 2016/0127641 A1* | 5/2016 | Gove .................. H04N 23/611 348/143 |
| 2018/0205889 A1* | 7/2018 | Abbas .................. H04N 23/90 |
| 2019/0317594 A1 | 10/2019 | Stent |
| 2020/0288136 A1* | 9/2020 | Fang .................. G06T 7/40 |
| 2021/0034904 A1* | 2/2021 | Lee .................. G06T 7/11 |
| 2022/0198803 A1* | 6/2022 | Tanaka .................. G06V 40/103 |
| 2022/0383653 A1* | 12/2022 | Yoshida .................. G06V 40/23 |

FOREIGN PATENT DOCUMENTS

| | | |
|---|---|---|
| JP | 2006-191535 A | 7/2006 |
| JP | 2009-212787 A | 9/2009 |
| JP | 2010-213213 A | 9/2010 |
| JP | 2017-227957 A | 12/2017 |
| JP | 2018-057596 A | 4/2018 |
| WO | 2020/202865 A1 | 10/2020 |
| WO | 2020/261101 A1 | 12/2020 |

OTHER PUBLICATIONS

Li Junnan et al, "Weakly-Supervised Multi-Person Action Recognition in 360° Videos", 2020 IEEE Winter Conference on Applications of Computer Vision (WACV), IEEE, Mar. 1, 2020 (Mar. 1, 2020), p. 497-505.
Office Action issued Nov. 26, 2024 in Japanese Patent Application No. 2021-043464, 9 pages.
Office Action issued Nov. 28, 2025 in Chinese Patent Application No. 202280014996.4, 8 pages.

* cited by examiner

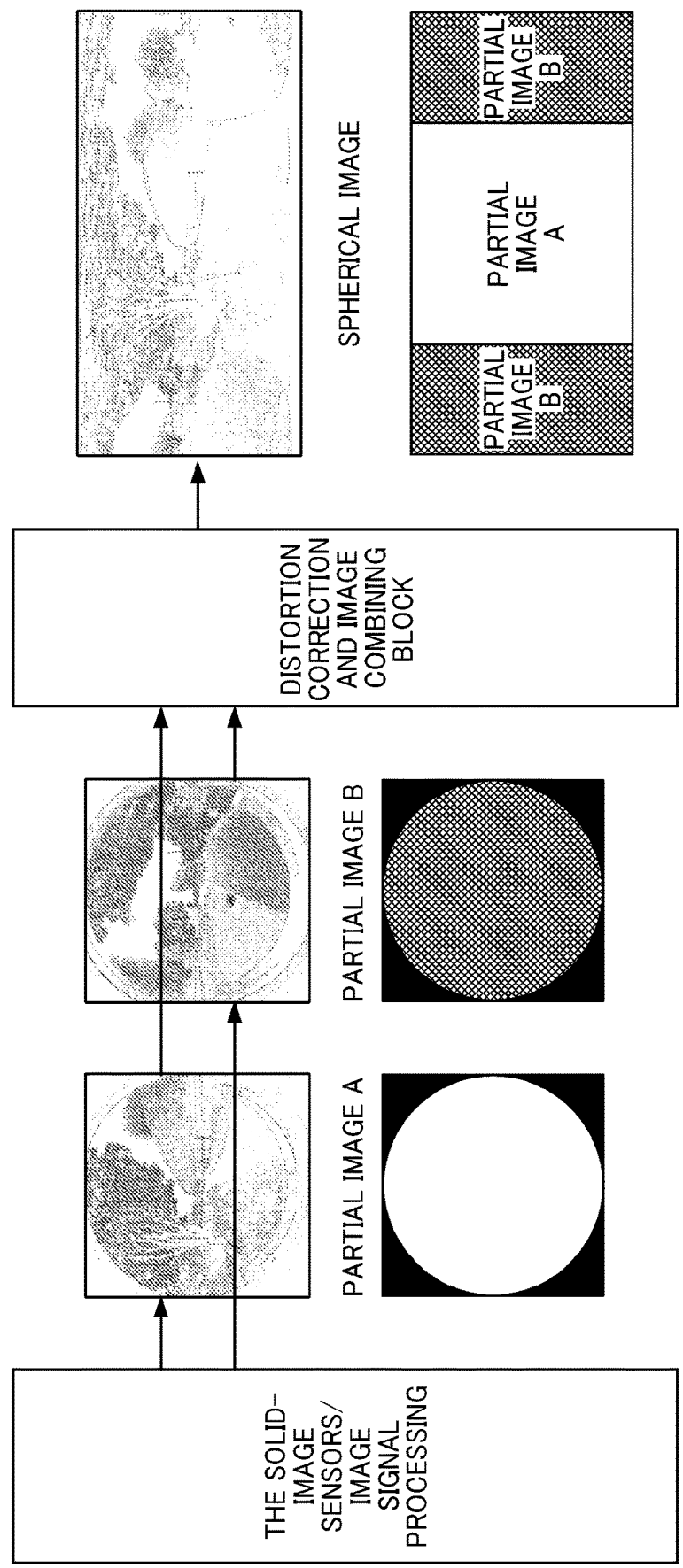

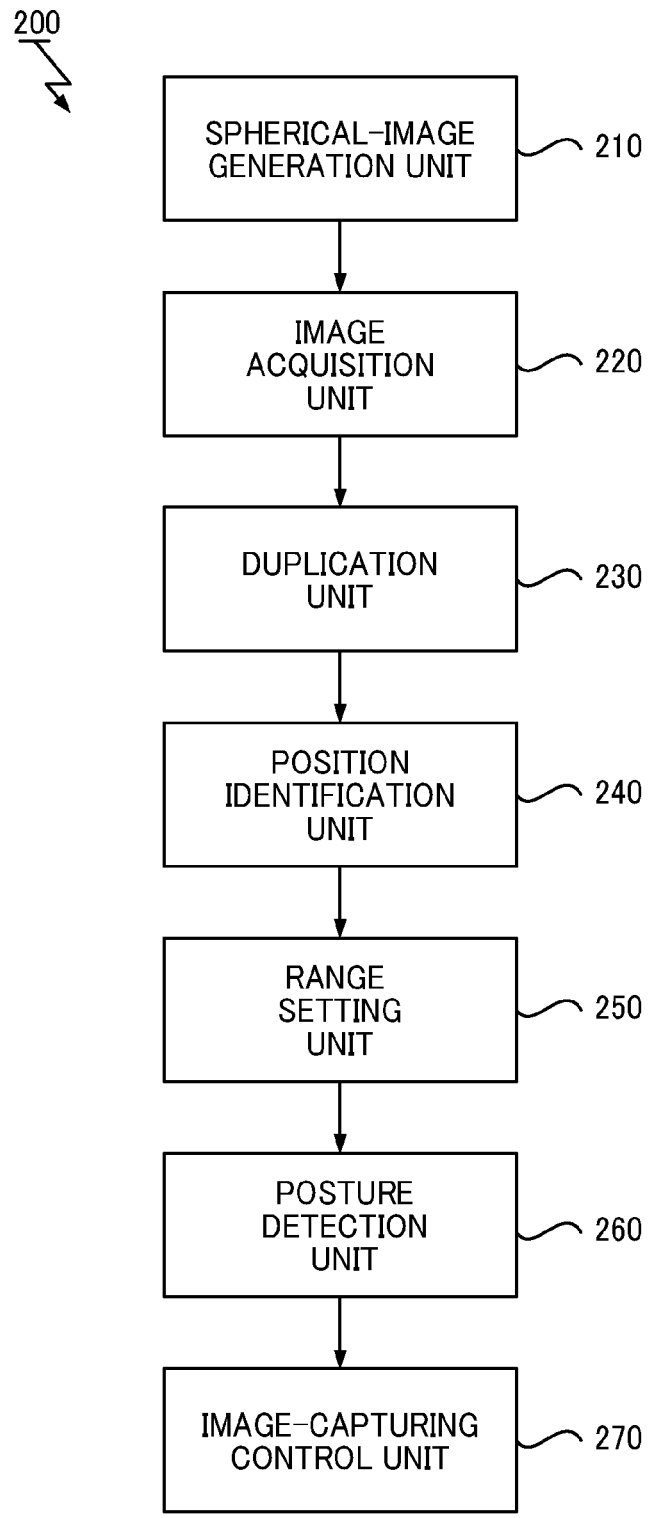

| NUMBER | BODY PART |
|---|---|
| 0 | NOSE |
| 1 | HEART |
| 2 | RIGHT SHOULDER |
| 3 | RIGHT ELBOW |
| 4 | RIGHT WRIST |
| 5 | LEFT SHOULDER |
| 6 | LEFT ELBOW |
| 7 | LEFT WRIST |
| 8 | RIGHT WAIST |

| NUMBER | BODY PART |
|---|---|
| 9 | RIGHT KNEE |
| 10 | RIGHT ANKLE |
| 11 | LEFT WAIST |
| 12 | LEFT KNEE |
| 13 | LEFT ANKLE |
| 14 | RIGHT EYE |
| 15 | LEFT EYE |
| 16 | RIGHT EAR |
| 17 | LEFT EAR |

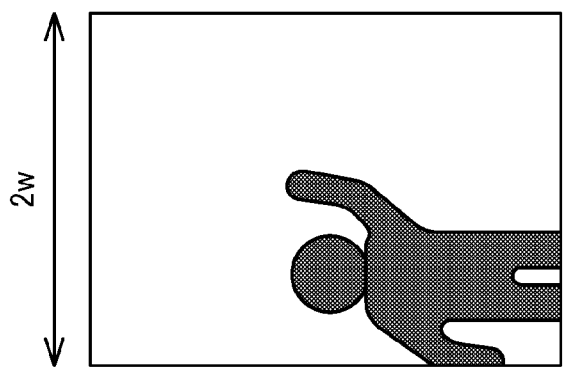
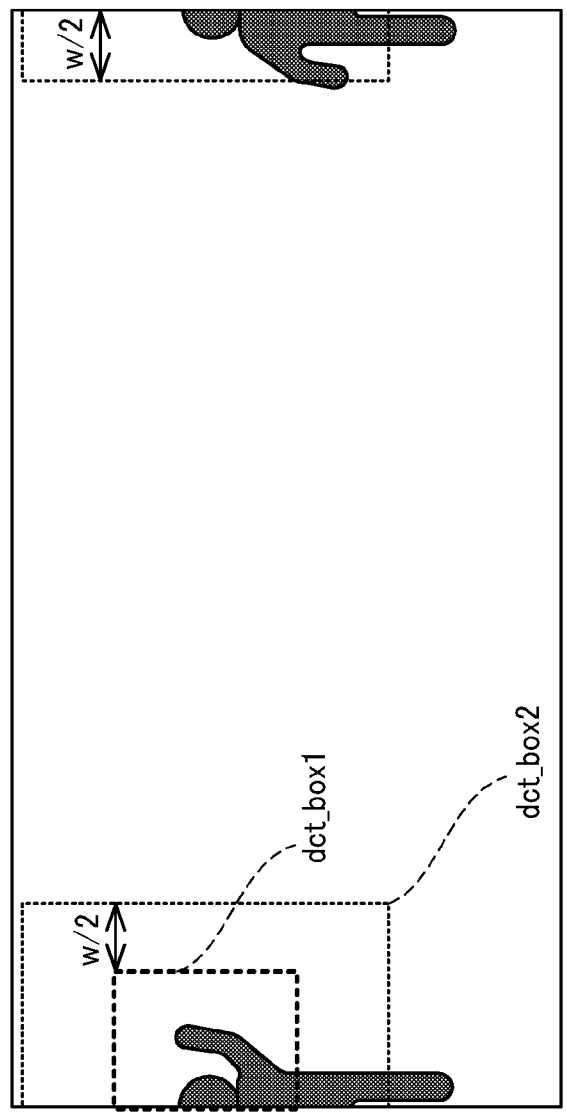

IMAGE PROCESSING METHOD, RECORDING MEDIUM, IMAGE PROCESSING APPARATUS, AND IMAGE-CAPTURING APPARATUS WHICH FIRST DETECTS A REGION OF A PERSON AND THEN DETECTS A STATE OF THE PERSON

CROSS-REFERENCE TO RELATED APPLICATIONS

This application is based on PCT filing PCT/IB2022/051503, filed Feb. 21, 2022, which claims the priority to Japanese Patent Application No. 2021-043464, filed on Mar. 17, 2021, the entire contents of each are incorporated herein by reference in its entirety.

TECHNICAL FIELD

The present disclosure relates to an image processing technique, and more particularly, to an image processing method, a recording medium, an image processing apparatus, and an image-capturing apparatus.

BACKGROUND ART

A technique for detecting a posture or the like of a person from an image using deep learning has been known. In addition, a technique for automatically performing shooting when a state of a predetermined person such as the posture, facial expression, or gesture is detected. For example, Japanese Patent No. 4227257 discloses a configuration that automatically captures an image of a subject when its face, posture, and motion become a predetermined state after being recognized. Japanese Patent No. 6729043 discloses a technique for identifying the position of a person in an image with high accuracy, and more specifically discloses a configuration in which, when another object is superimposed on a detected person region, the person position is identified based on the posture of the person if the other object is a moving object, and a predetermined position of the person region is identified as the person position if the other object is a non-moving object.

However, the above-described technique has room for improvement from the viewpoint of achieving both reduction in detection time and detection accuracy to detect the state of a person from within a screen.

CITATION LIST

Patent Literature

[PTL 1]
Japanese Patent No. 4227257
[PTL 2]
Japanese Patent No. 6729043

SUMMARY OF INVENTION

Technical Problem

In view of the above circumstances, the present disclosure aims at providing an image processing method capable of achieving both a reduction in detection time and an increase in detection accuracy to detect the state of a person from a screen.

Solution to Problem

An image processing method includes acquiring an image; identifying a position of a region of a person in the acquired image; setting an object detection range based on the identified position of the region of the person; and detecting a state of the person based on the set object detection range.

Advantageous Effects of Invention

Embodiments of the present disclosure enables both a reduction in detection time and an increase in detection accuracy to detect the state of a person from a screen.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 4A is an illustration of processes of generating image data for a spherical image.

FIG. 5 is a block diagram of a functional configuration that implements image-capturing control based on human-posture detection according to a first example embodiment.

FIGS. 13A and 13B are illustrations of a process of duplicating an image for the detection process in the spherical-image capturing apparatus according to the second embodiment.

DESCRIPTION OF EMBODIMENTS

Figure 1:
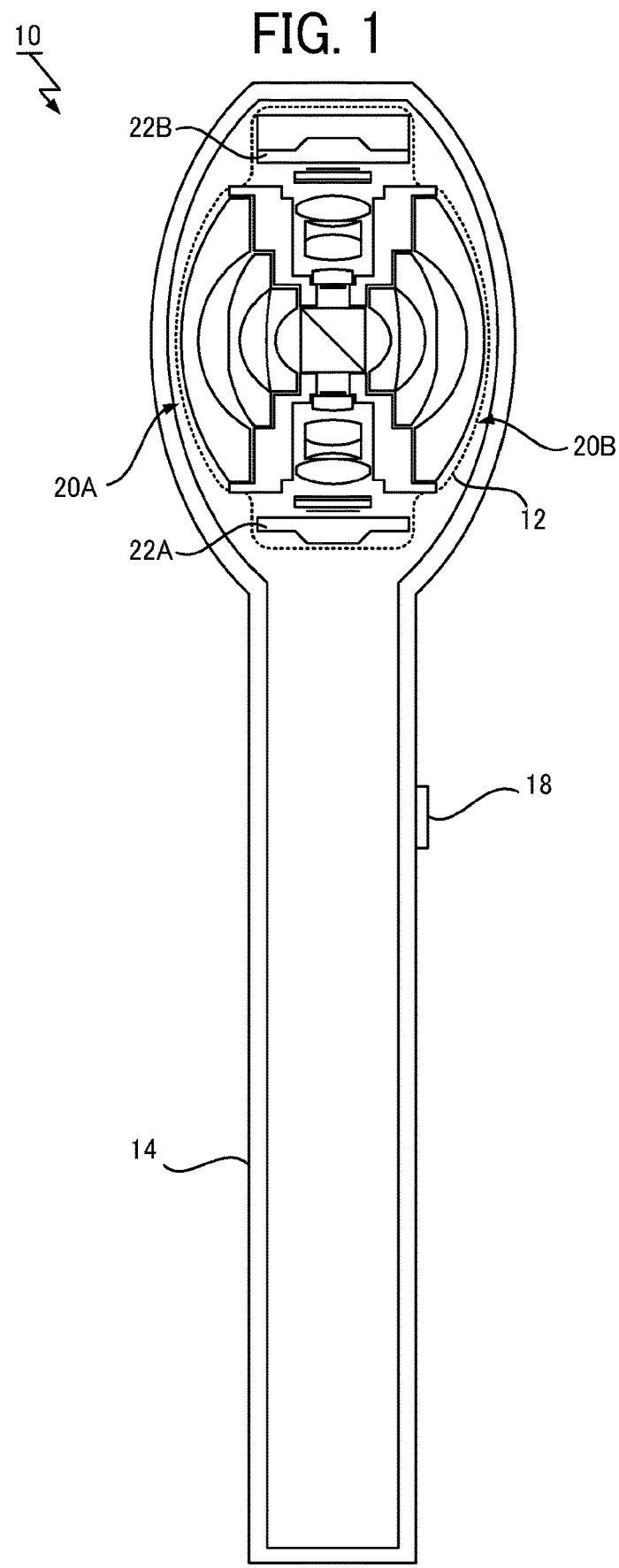
FIG. 1 is a sectional view of a spherical-image capturing apparatus according to an embodiment.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the following embodiments, an image processing apparatus is an example of an image-capturing apparatus, and the image-capturing apparatus is an example of a spherical-image capturing apparatus 10 including two fish-eye lenses.

Hereinafter, an overall configuration of the spherical-image capturing apparatus 10 according to the present embodiment will be described with reference to FIGS. 1 and 2. FIG. 1 is a sectional view of the spherical-image capturing apparatus 10 according to an embodiment. The spherical-image apparatus 10 in FIG. 1 includes an imaging body 12, a casing 14 that holds the imaging body 12 and components such as a control board and a battery, and a shutter button 18 provided on the casing 14.

The imaging body 12 (an image-capturing means) illustrated in FIG. 1 includes two lens optical systems 20A and 20B and two image sensors 22A and 22B. The image sensors 22A and 22B are, for example, a charge coupled device (CCD) sensor or a complementary metal oxide semiconductor (CMOS) sensor. Each of the lens optical systems 20A and 20B (hereinafter, referred to collectively as a lens optical system 20) is configured as a fish-eye lens consisting of, for example, seven lenses in six groups or fourteenth lenses in ten groups. In the embodiment illustrated in FIG. 1, the above-mentioned fish-eye lens has a full angle of view of larger than 180 degrees (=360 degrees/n, where n denotes the number of optical systems and n is 2), preferably has an angle of view of 190 degrees or larger. In the embodiment described below, two fisheye lenses each having a full angle of view of 180 degrees or more are used. However, three or more lens optical systems and image sensors may be included as long as a predetermined angle of view is obtained as a whole. In addition, in the embodiment described below, a fisheye lens is used. However, as long as a predetermined angle of view is obtained as a whole, other wide-angle lenses or super-wide-angle lenses may be used instead of the fisheye lens.

The relative position between the optical elements (lenses, a prism, a filter, and an aperture stop) of the two lens optical systems 20A and 20B is determined with respect to the image sensors 22A and 22B. More specifically, these elements are positioned such that the optical axis of the optical element of each of the lens optical systems 20A and 20B meets the central portion of the light receiving area of corresponding one of the image sensors 22 at the right angle and such that the light receiving area serves as the image-forming plane of corresponding one of the fish-eye lenses. In the embodiment to be described, a turning optical system is used in which two right-angle prisms distribute the light beams collected by the lens optical systems 20A and 20B to the image sensors 22A and 22B, respectively, so as to reduce disparity between the optical systems. However, no limitation is intended thereby, and a three-turning structure, in which an incident light beam turns three times while traveling within the optical system, may be used to reduce disparity. Alternatively, a straight optical system may be used to reduce cost.

In the embodiment illustrated in FIG. 1, the lens optical systems 20A and 20B have the same specification, and are combined facing the opposite directions such that the optical axes thereof match with each other. The image sensors 22A and 22B convert the light distribution of the received light into an image signal, and sequentially output images to the image processing block of the controller. As will be described later in detail, the images captured by the respective image sensors 22A and 22B are combined to generate an image over a solid angle of $4\pi$ steradian (hereinafter, such an image is referred to as a "spherical image"). The spherical image is an image of all the directions that can be seen from an image capturing point. In the embodiment described below, a spherical image is generated. However, in some embodiments, the spherical image may be an omnidirectional image obtained by capturing only a horizontal plane at 360 degrees, i.e., a 360 degree panoramic image, or may be an image obtained by capturing a part of an omnidirectional view or a panoramic view at a horizontal plane of 360 degrees (for example, an omnidirectional (dome) image obtained by capturing a horizontal plane at 360 degrees and a vertical plane at 90 degrees from the horizontal plane). The spherical image may be acquired as a still image or a moving image.

Figure 2:
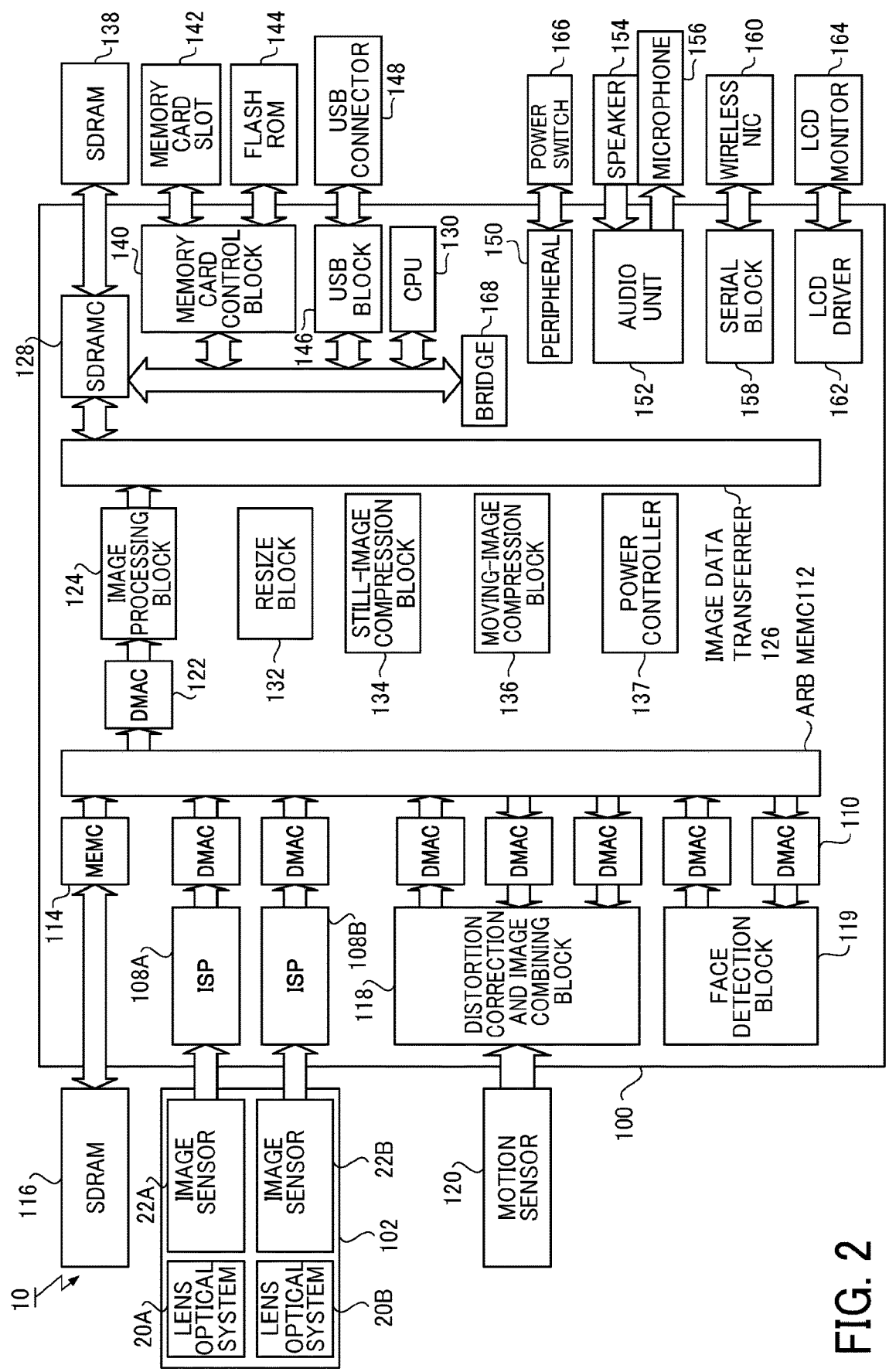
FIG. 2 is a hardware block diagram of the spherical-image capturing apparatus in FIG. 1.

FIG. 2 is a block diagram of a hardware configuration of the spherical-image capturing apparatus 10 according to an embodiment. The spherical-image capturing apparatus 10 includes a digital still camera processor (hereinafter, referred to simply as a processor) 100, a barrel unit 102, and various components coupled to the processor 100. The barrel unit 102 includes the pair of lens optical systems 20A and 20B and the pair of image sensors 22A and 22B as described above. Each one of the image sensors 22A and 22B are controlled in accordance with control instructions sent from a central processing unit (CPU) 130 inside the processor 100, which will be described later.

The processor 100 includes an image signal processor (ISP) 108, a direct memory access controller (DMAC) 110, an arbiter or arbitration memory controller (ARBMEMC) 112 that mediates the memory access, a memory controller (MEMC) 114 that controls the memory access, a distortion correction and image combining block 118, and a face detection block 119. The ISP 108A and 108B performs automatic exposure (AE) control, white balance adjustment, and gamma setting on images input through signal processes of the image sensors 22A and 22B, respectively. In FIG. 2, the image sensors 22A and 22B are provided for the image sensors ISP 108A and 108B. This configuration is merely one example. In some examples, one ISP is provided for two image sensors 22A and 22B.

The MEMC 114 is connected a synchronous dynamic random access memory (SDRAM) 116. The SDRAM 116 temporarily stores data when the ISP 108A and 108B and the distortion correction and image combining block 118 perform their processes. The distortion correction and image combining block 118 performs distortion correction and zenith correction on two captured images obtained from two sets of the lens optical systems 20 and the image sensors 22 using information from the motion sensor 120, and combines the corrected images. The motion sensor 120 may include a three-axis acceleration sensor, a three-axis angular velocity sensor, and a geomagnetic sensor. The face detection block 119 detects a face from the image and identifies a location of a face of a person. In addition to or instead of the face detection block 119, an object recognition block that recognizes a whole body image of a person, a face of an animal such as a cat or a dog, or another object such as a car or a flower is provided.

The processor 100 includes a direct memory access controller (DMAC) 122, an image processing block 124, the CPU 130, an image data transferer 126, a synchronous dynamic random access memory controller (SDRAMC) 128, a memory card control block 140, a universal serial bus (USB) block 146, a peripheral block 150, an audio unit 152, a serial block 158, a liquid crystal display (LCD) driver 162, and a bridge 168.

The CPU 130 controls an operation of each unit of the spherical-image capturing apparatus 10. The image processing block 124 performs various image processing operations on image data. The processor 100 further includes a resize block 132. The resize block 132 increases or reduces the size of the image data by interpolation. The processor 100 further includes a still-image compressing block 134. The still-image compression block 134 is a codec block for compressing or expanding a still image so as to change the format of the still image to a still-image format such as a joint photographic experts group (JPEG) and a tagged image file format (TIFF). The still-image compression block 134 is used to generate still image data of the generated spherical image. The processor further includes a video-compression block 136. The moving-image compression block 136 is a codec block for compressing or expanding moving images so as to change the format of the moving images to a video format such as a moving picture experts group (MPEG)-4 advanced video coding (AVC)/H.264. The moving-image compression block 136 is used to generate moving-image data of the generated spherical image. The processor 100 further includes a power controller 137.

The image data transferer 126 transfers the image that has been processed by the image processing block 124. The SDRAMC 128 controls the SDRAM 138 connected to the processor 100, and the SDRAM 138 stores the image data on a temporary basis while various kinds of image processing is being performed on the image data inside the processor 100. The memory card control block 140 controls reading and writing to a flash read-only memory (ROM) 144 and a memory card that is inserted into a memory card slot 142. The slot 142 is a slot through which a memory card is detachably inserted into the spherical-image capturing apparatus 10. The USB I/F 146 controls USB communication with an external device such as a PC connected via the USB connector 148. A power switch 166 is connected to the peripheral block 150.

The audio unit 152 is connected to a microphone 156 to which an audio signal is input by a user, and a speaker 154 from which the recorded audio signal is output, and controls the input and output of the audio data. The serial block 158 controls serial communication with an external device such as a smartphone or a PC and is connected to a wireless network interface card (NIC) 160. A liquid crystal display (LCD) driver 162 drives the LCD monitor 164, and converts the image signals into signals such that the LCD monitor 164 can display thereon various kinds of conditions. In addition to those in FIG. 2, a video interface such as high-definition multimedia interface (HDMI, registered trademark) may be provided.

A flash read-only memory (ROM) 144 stores therein a control program described in a code readable by the CPU 130 and various kinds of parameters. When the power is turned on by the operation of a power switch 166, the control program stored in the ROM 144 is loaded into a main memory operating as a work area for the CPU 130. The CPU 130 executes the program read into the main memory to control the operations of the device, and temporarily stores data for controlling the operations in a SDRAM 138 and a local static random access memory (SRAM). Note that the rewritable flash ROM 144 allows changes in the control program and the parameters for control and thus facilitates upgrade of the version of the functions.

Figure 3:
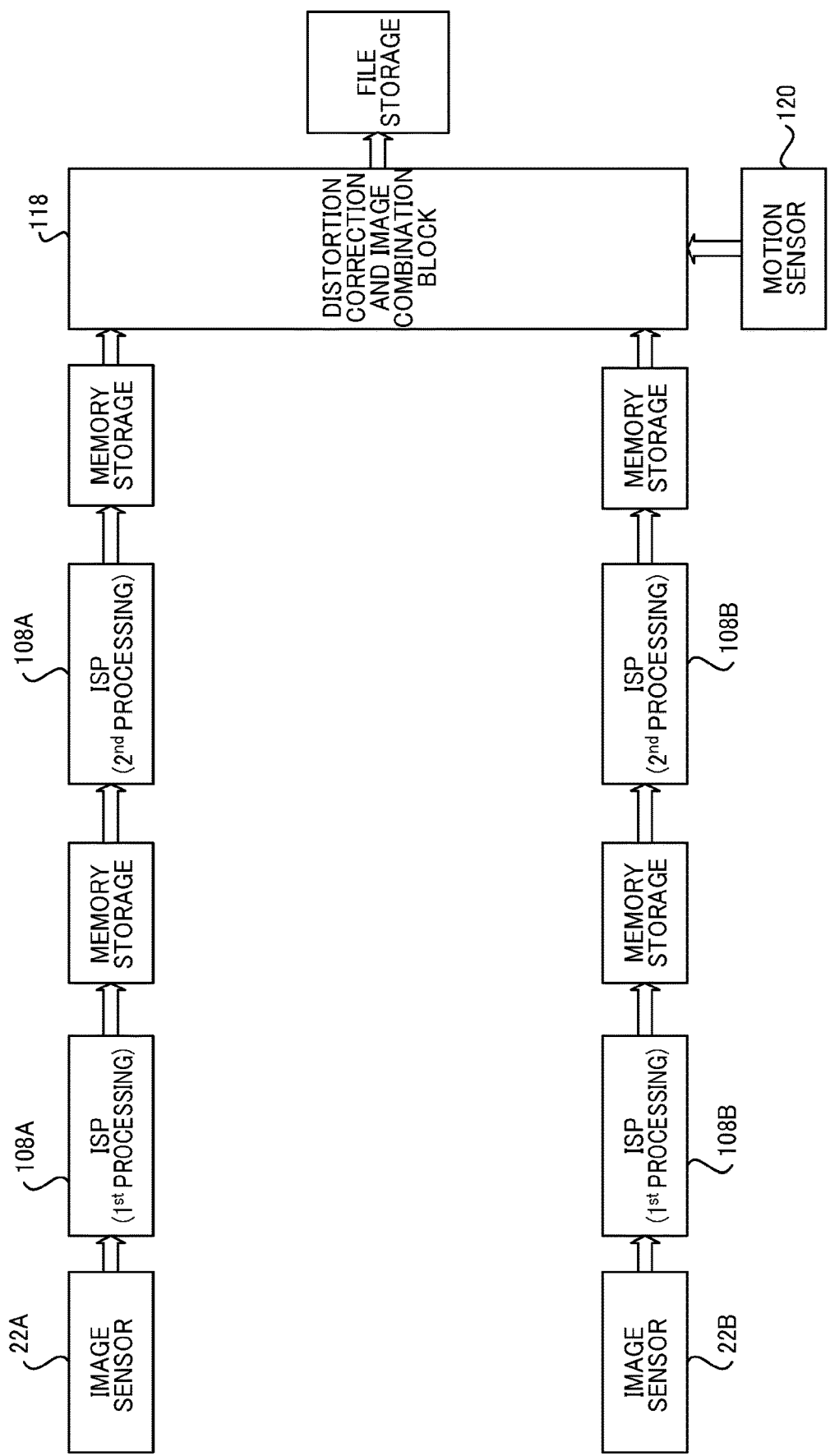
FIG. 3 is a block diagram of operations of image processing performed by the spherical-image capturing apparatus in FIG. 1.

FIG. 3 is a block diagram of operations in image processing performed by the spherical-image capturing apparatus 10 in FIG. 1. As illustrated in FIG. 3, the image sensors 22A and 22B capture images using predetermined exposure-condition parameters. Subsequently, the ISP 108A and the ISP 108B perform first image signal processing (first processing) on the images output from the image sensor 22A and the image sensor 22B, respectively. Each first image signal processing involves an optical black (OB) correction, a defective pixel correction, a linear correction, a shading correction, and an area-segmentation averaging, and the results are stored in the memory.

After completion of the first image signal processing (ISP1), the ISP 108A and the ISP 108B perform second image signal processing (second processing 2). The second image signal processing involves white balance (WB) gain processing, gamma (γ) correction, Bayer interpolation processing, YUV conversion processing, edge enhancement (YCFLT) processing, and color correction, and the results are stored in a memory.

After the Bayer raw image from the image sensor 22A undergoes the first image signal processing of the ISP 108A, the image that has undergone the first image signal processing is stored in the memory. Similarly, after the Bayer raw image from the image sensor 22B undergoes the first image signal processing of the ISP 108B, the image that has undergone the first image signal processing is stored in the memory.

Notably, to adjust the brightness of a boundary between the images of both eyes, the exposure degree of the image sensors 22A and 22B is set to an appropriate value (i.e., compound-eye autoexposure (AE)) using the area integrated value obtained by the area-segmentation averaging. Alternatively, the image sensors 22A and 22B have the respective simplified AE processing capabilities and are independently set to an appropriate exposure.

The data that has undergone the second image signal processing further undergo the distortion correction and combination process by the distortion correction and image combining block 118, thus generating a spherical image. In the process of distortion correction and combination process, the zenith correction and rotation correction are performed as appropriate based on information from the motion sensor 120. For storage of captured images, still images are compressed into JPEGs by the still-image compressing block 134 in FIG. 2 and stored in the memory in the form of files (i.e., the image data is tagged). Moving images are compressed into a format such as MPEG-4 AVC/H. 264 format and stored in the memory (i.e., the image data is tagged). Alternatively, the data is stored in a medium such as an SD card. Further, a wireless local area network (LAN) (Wi-Fi) or Bluetooth (registered trademark) is used to transfer data to an information information processing apparatus 50 such as a smartphone.

Figure 4B:
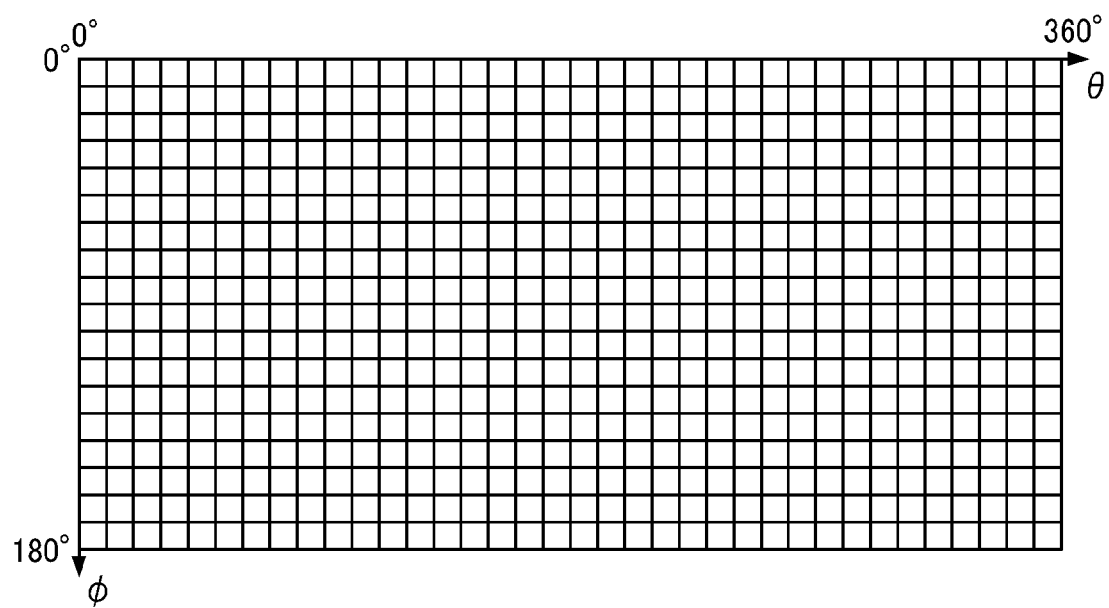
FIG. 4B is an illustration of a data structure of the spherical image in a plane.

Hereinafter, a process of generating a spherical image and a generated spherical image are described with reference to FIGS. 4A, 4B, and 4C. FIG. 4A is an illustration of the data structure of each image and the data flow of the image in the process of generating a spherical image. First, an image directly captured by each of the image sensors 22A and 22B is an image that roughly convers a hemisphere of the whole sphere as a field of view. Light that passes through the lens optical system 20 is focused on the light receiving area of the image sensor 22 to form an image according to a predetermined projection system. The image sensor 20 is a two-dimensional image sensor whose light-receiving area defines a planar area. Accordingly, the image formed by the image sensor 130 is image data represented by the plane coordinate system. A formed image is configured as a typical fish-eye image that contains an image circle as a whole in which each captured area is projected, as illustrated in a partial image A and a partial image B in FIG. 4A.

Multiple fish-eye images of each frame captured by the multiple image sensors 22A and 22B is subjected to the distortion correction and combination process to form a spherical image for each frame. In the synthesis processing, two spherical images each including a complementary hemispherical portion are generated from the partial images each configured as a planar image. Then, the two spherical images including the respective hemispherical portions are joined together (undergoes stitching) by matching the overlapping areas of the hemispherical portions, and the spherical images are synthesized to generate a full spherical (omnidirectional) image including the whole sphere. Although the image of each hemispherical portion includes an overlapping region between image, blending is performed on the overlapping region so as to form a natural-looking joint during the combination process.

FIG. 4B is an illustration of a planar data structure of the image data of a spherical image used in the embodiment of the present disclosure. FIG. 4C is an illustration of the data structure of the image data of a spherical image (omnidirectional image), according to the present embodiment. As illustrated in FIG. 4B, the image data of the spherical image is expressed as an array of pixel values in the coordinates defined by the vertical angle $\varphi$ corresponding to the angle with reference to a referential axis and the horizontal angle $\theta$ corresponding to the angle of rotation around the referential axis. The vertical angle $\varphi$ ranges from 0° to 180° (alternatively from −90° to +90°), and the horizontal angle $\theta$ ranges from 0° to 360° (alternatively from −180° to +180°).

Figure 4C:
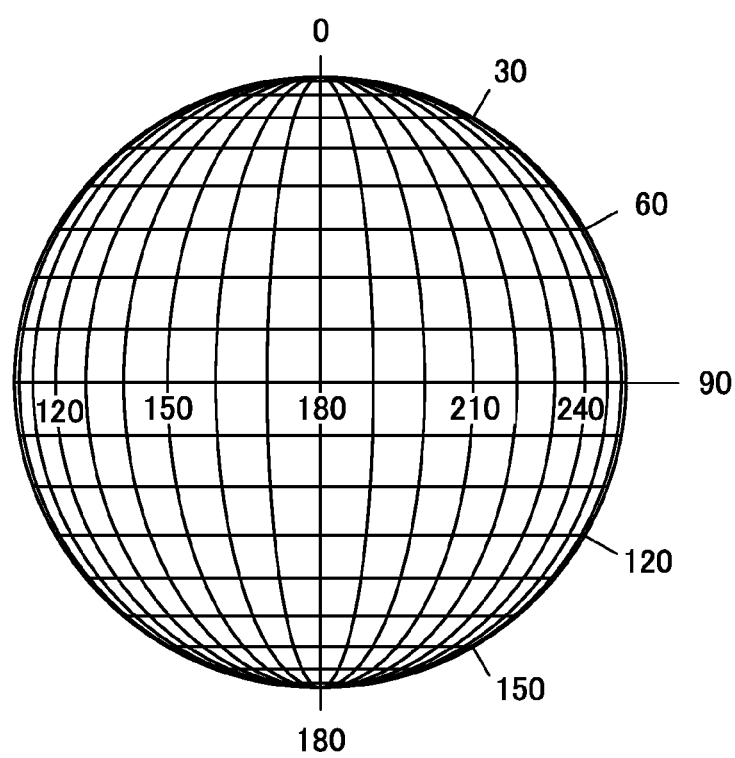
FIG. 4C is an illustration of the data structure of the spherical image in a sphere.

As illustrated in FIG. 4C, the respective coordinate values $(\theta, \varphi)$ of the spherical image format (the spherical data structure of the image data) are associated with the points on the sphere that represents all directions from the photographing location. Thus, all directions are associated with the points on the spherical images. The plane coordinates of the fish-eye image (partial image) captured by a fish-eye lens are associated with the coordinates on the sphere of the spherical image, which are included in a predetermined conversion table. The transformation table includes data prepared in advance by, for example, a manufacturer in accordance with a predetermined projection model based on design data of each lens optical system. The data of the transformation table is used for transforming a fish-eye mage (partial image) into a spherical image.

As described above, the technique is known that detects a posture, a gesture, or a facial expression of a person from an image using deep learning and, in response to detecting a predetermined posture, gesture, or facial expression, automatically captures an image of the person.

The image-capturing control based on the posture, gesture, and facial expression of a person as described above involves detecting the state of a person serving as a subject, or an object whose image is to be captured, by image processing. In such image capturing, the person as an object to be detected (target object) usually occupies a certain percentage of the screen. In an application to prevent the subject from appearing in the screen as much as possible and remotely control the image-capturing apparatus according to a specific posture or a change in posture, however, the operator (a user of the image-capturing apparatus) is more likely to occupy a smaller area of the screen. In other words, the operator appearing in the screen is remotely controlling the image-capturing apparatus and is not a main subject.

When detecting the state of the person described above, in order to shorten the detection time, the detection process is performed by reducing the number of pixels for which the detection process is performed, by reducing the image. However, there is a trade-off relationship between the processing accuracy and the detection time, and when the image is reduced and the detection operation is performed, the detection accuracy decreases. Further, in a case where the ratio of the operator who is the object to be detected occupying the screen is small, the number of pixels occupied by the object to be detected is small. With a reduction in the entire image, the number of pixels is further reduced, and the detection accuracy of the posture change is deteriorated.

Furthermore, the spherical image-capturing apparatus 10 as described above has difficulties specific to a spherical image. For example, in a fish-eye image, distortion of a captured image of the person is large, and in a case where a person is present at a boundary between multiple fish-eye images (a state in which a person straddles the fish-eye images), posture detection accuracy is lowered. The multiple fish-eye images are converted into equirectangular images, and the equirectangular images are joined together to form a spherical image. Then, detecting a person from the spherical image reduces distortion in and around the equator and prevents the person from being divided between the images. This can increase the accuracy of detection of the posture of the person but still have the following difficulties.

More specifically, even with a constant distance between the image-capturing apparatus and the operator constant, wider angles of view of lens in the image-capturing apparatus allows smaller proportion of the person within the screen. The spherical image in which two fish-eye images are joined together may prevent a person at the boundary between the fish-eye images from being divided between the fish-eye images. However, the spherical image, whose view circulates 360 degrees in the horizontal direction (i.e., the spherical image is a circular-view image), is cut at the peripheral portion or end portions. When the person is divided between the end portions of the spherical image, the accuracy of detection of the human posture deteriorates. Particularly in a configuration that includes two imaging units in the front and back portions of the image-capturing apparatus and associates a lens front with a central portion of a spherical image as illustrated in FIG. 1, a photographer (a user) who desires not to appear in the screen usually remotely controls image capturing with, for example, the shutter button 18 on the side of the image-capturing apparatus to prevent himself/herself from being reflected in the center of the captured spherical image. In such a case, a person is divided between the end portions of the spherical image.

In view of the above, the spherical-image capturing apparatus 10 according to an embodiment of the present invention acquires an image, identifies a position of a person region from the acquired image, and sets an object detection range based on the identified position of the person region. The spherical-image capturing apparatus 10 further detects the state of the person based on the set object detection range in the image. The above-described configuration identifies a region in which a person is present (i.e., a person region) within the screen, and performs a detection process on the range set based on the identified person region, without performing a detection process on the entire image. This enables a reduction in the number of pixels that undergo the detection process and thus achieves a shorter detection time. This configuration does not involve reducing the image and allows the number of pixels of a person to remain unchanged, thus preventing deterioration in the detection accuracy. This configuration enables both a reduction in detection time and an increase in detection accuracy to detect the state of a person from a screen.

At least one embodiment of the present invention duplicates one end portion of the spherical image to allow the duplicated one end portion to be continuous with the other end portion of the spherical image in at least an object detection range of a spherical image whose view circulates in at least one direction (i.e., a circular view in at least one direction). The configuration according to the above-described embodiments allows higher detection accuracy of a person as an object to be detected using equirectangular images converted from spherical images, even if the object to be detected is divided between the images.

The following describes the image-capturing control based on the human-posture detection performed by the spherical-image capturing apparatus 10 according to the first embodiment, with reference to FIGS. 5 to 8.

FIG. 5 is a block diagram of a functional configuration that implements an image-capturing control based on the human-posture detection, according to a first embodiment. The functional block 200 illustrated in FIG. 5 includes a spherical-image generation unit 210, an image acquisition unit 220, a duplication unit 230, a position identification unit 240, a range setting unit 250, a posture detection unit 260, and an image-capturing control unit 270.

The spherical-image generation unit 210 generates a spherical image (an equirectangular image) captured by the image sensor 22 (the image sensors 22A and 22B) and combined by the distortion correction and image combining block 118. Note that the image-capturing control based on the results of the human-posture detection may be performed before the actual image capturing, i.e., before the shutter button is pressed. In the following embodiments, fish-eye images are converted into a spherical image in a stage before the actual image capturing, and the spherical image generated after the conversion undergoes the human-posture detection.

The image acquisition unit 220 acquires an image to be processed. The image acquired by the spherical-image capturing apparatus 10 has an angle of view of 360 degrees in at least first direction (or at least one direction). More specifically, the image is a spherical image having an angle of view of 360 degrees in the horizontal direction and 180 degrees in the vertical direction (i.e., an angle of view of 360 degrees in the horizontal direction and an angle of view of 360 degrees in the vertical direction including 180 degrees in vertical direction in the other side of the 360 degrees in the horizontal direction).

Although the spherical image has an image-captured range whose view circulates in the horizontal direction (i.e., a circular view in the horizontal direction), its image data is one image having a predetermined horizontal position reflected in the end portion of the image. When a person is located at the end portion, a region including the person is separated between the end portions of the image, thus possibly degrading the detection accuracy for a human posture. To deal with such a discontinuity between the end portions of the image, the duplication unit 230 according to an embodiment duplicates one end portion of the spherical image to allow the one end portion to be continuous with the other end portion of the spherical image, and further adds the duplicated portion to the other end portion. The duplication unit 230 performs duplication at a stage before a process of identifying the position of a region of a person (hereinafter, referred to simply as the person region) by the position identification unit 240.

The position identification unit 240 identifies the position of the person region in the acquired image. Any technique, including lightweight person detection and face detection, is used to identify the position of the region of the person. In at least one embodiment, as described above, the position identification unit 240 identifies the position of the person region based on an image modified by adding a duplicated one end portion of a spherical image to the other end portion of the spherical image. In at least one embodiment, the position of the person region is detected by performing the person detection or the face detection based on an acquired image. Alternatively, the position of the person region is detected by performing the moving-object detection based on a difference between images of multiple frames continuously acquired.

The range setting unit 250 sets an object detection range with respect to a spherical image, based on the identified position of the person region. The object detection range set by the range setting unit 250 is a part of the spherical image. In some embodiments, the part of the spherical image undergoes the detection process. In some other embodiments, an image of a region corresponding to the object detection range set within the spherical image is duplicated, and the duplicated image undergoes the detection process.

The posture detection unit 260 detects a posture of the person based on the image features of the object detection range in the spherical image. In this case, the object detection range set by the range setting unit 250 is subjected to the detection process. In this case, the object detection range is not reduced. Alternatively, even if trimming, white painting, black painting, or reduction is performed according to the input layer of the deep learning model used by the posture detection unit 260, the entire spherical image is not reduced but a limited object detection range, which is a part of the spherical image, is reduced, and thus a decrease in the number of pixels is prevented or reduced. The posture detection unit 260 perform processing involving detecting a skeletal frame of a person from an acquired image and detecting a posture of the person based on the detected skeletal frame. A deep learning model is used for the skeletal frame detection and posture detection.

The image-capturing control unit 270 controls the imaging body 12 based on the posture of the person detected in the processes described above. More specifically, after the posture detection unit 260 detects a specific posture, according to the detected posture, the image-capturing control unit 270 controls operations for the capabilities of the camera, including releasing the shutter (capturing an image), setting a timer, or changing image-capturing parameters or modes.

Figure 6:
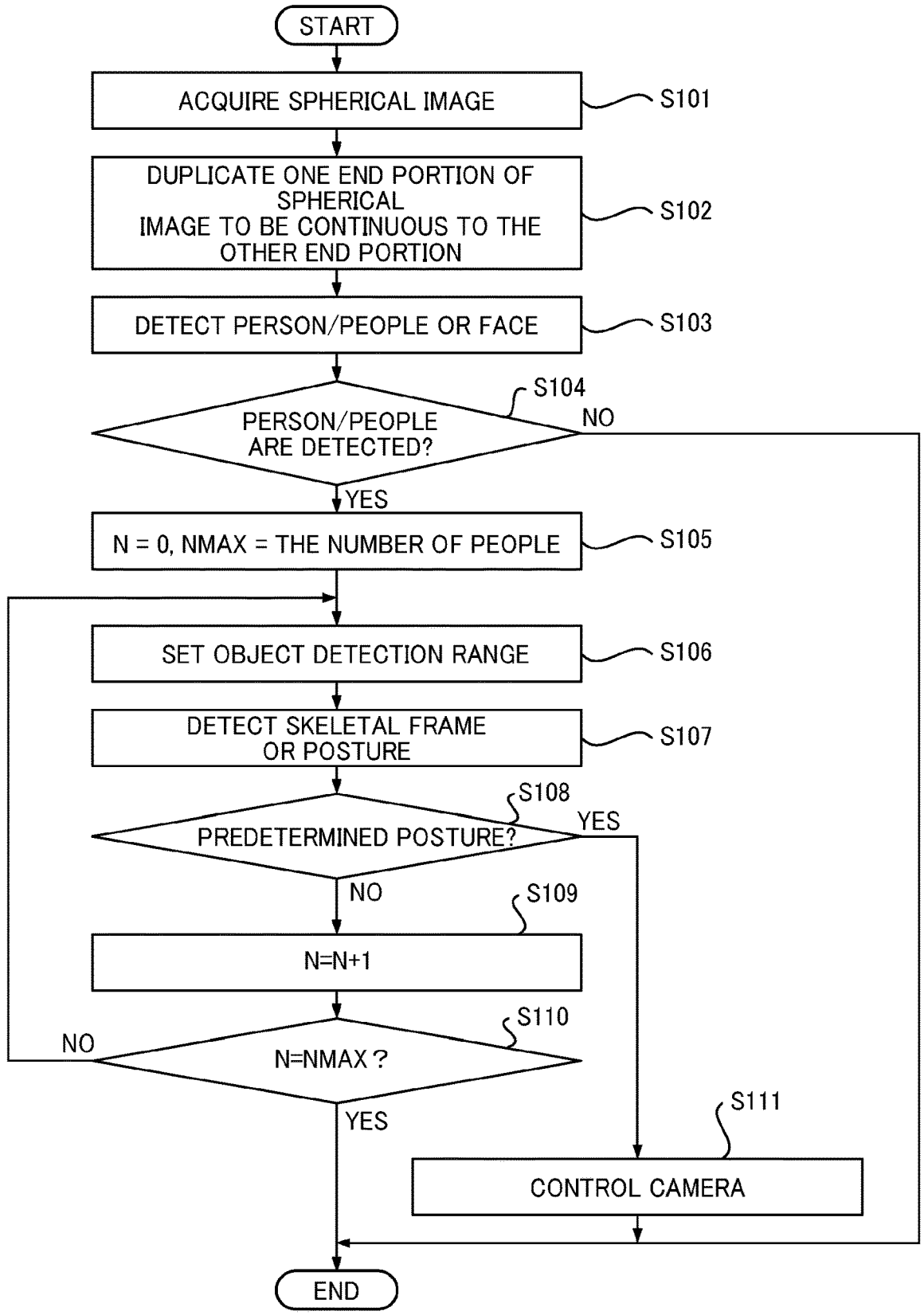
FIG. 6 is a flowchart of the image-capturing control based on the human-posture detection according to the first embodiment.

FIG. 6 is a flowchart of an image-capturing control based on the human-posture detection according to the first embodiment.

The processing in FIG. 6 is executed for each frame in response to start of generation of an image frame after the spherical-image capturing apparatus 10 starts up or startup of the image-capturing control capability based on the posture detection. Notably, FIG. 6 indicates a series of operations involving detecting a person, detecting a predetermined posture, and the releasing the shutter (the shutter button 18), which are performed on each spherical image in an equirectangular format of one frame output from the image sensors 22A and 22B to the SDRAM through the ISP 108A and the ISP 108B. However, the embodiments of the present invention is not particularly limited thereto, and in another embodiment, the processing is performed at regular frame intervals.

In step S101, the processor causes the image acquisition unit 220 to acquire a spherical image for one frame generated by the spherical-image generation unit 210. In step S102, the processor causes the duplication unit 230 to duplicate one end portion of the spherical image to allow the duplicated one end portion to be continuous with the other end portion of the spherical image, and add the duplicated one end portion to the other end portion of the spherical image so as to generate a modified image.

Figure 7A:
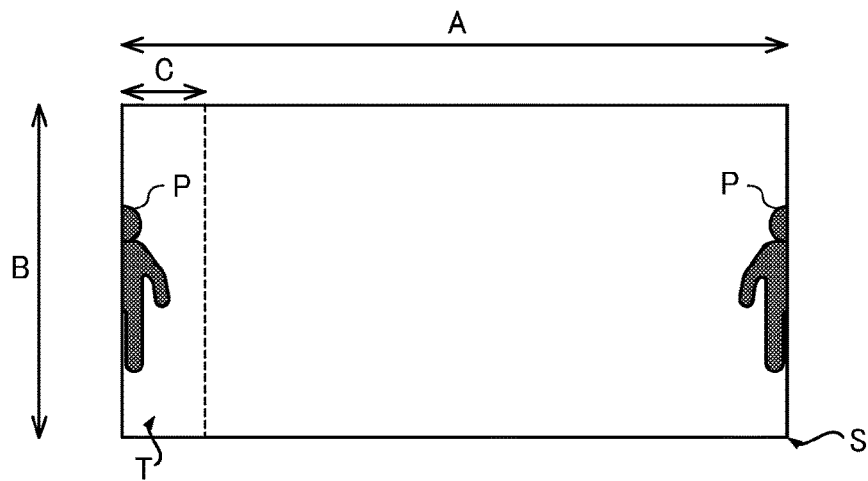
FIGS. 7A, 7B, and 7C are illustrations of a process of duplicating one end portion of a spherical image to allow the duplicated one end portion to be continuous with the other end portion of the spherical image, performed by the spherical-image capturing apparatus 10 according to a first embodiment.
Figure 7B:
Figure 7C:
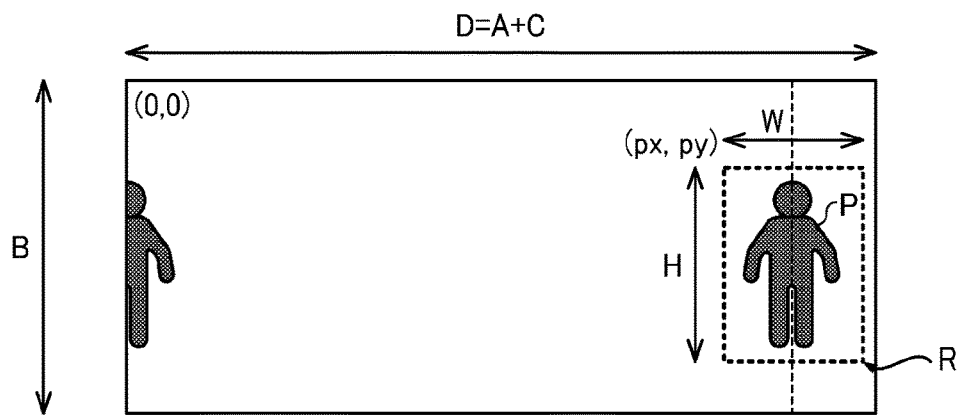

FIGS. 7A, 7B, and 7C are illustrations of a process of duplicating one end portion of a spherical image to allow the duplicated one end portion to be continuous with the other end portion of the spherical image, performed by the spherical-image capturing apparatus 10 according to an embodiment. In step S102 of FIG. 6, the processor generates an image modified by duplicating one end portion T of the spherical image to generate a duplicated end portion T' and joining the duplicated end portion T' to the other end portion S, as illustrated in FIGS. 7A and 7B. For convenience, when the size of the end portion to be duplicated is fixed and the image has a resolution (A×B) of 3840×1920, for example, the left end portion of 384×1920 (C×B), which is fixed and 10% of the image in the horizontal direction, is duplicated and joined to the right end of the spherical image to generate a modified spherical image of 4224×1920 (D×B).

In step S103, the processor causes the position identification unit 240 to identify the position of a region of a person (or, a person region) in the modified spherical image. As a result, the coordinates (px, py) and the size (height H and width W) representing the rectangular area (detection frame) R including the detected person P are output as illustrated in FIG. 7C. When multiple people are detected, the coordinates and sizes for the number of detected people are output. Notably, the process of identifying the position of the person region in step S103 uses any person-detection algorithm. For example, a technique such as the support vector machine (SVM) using a statistical learning method or the adaptive boosting (Ada Boost) is used. These techniques are usually lighter than the posture detection process. In the embodiment described below, the person detection is performed. In some other embodiments, the face detection may be performed.

Further, in some cases, the same object (a person) is detected using both an original image region to be duplicated at the left end of the spherical image and a duplicated image region at the right edge as illustrated in FIGS. 7A, 7B, and 7C. In this case, the detection result is obtained from a region including the original image region to be duplicated. Alternatively, the detection result is obtained from a region including both the original image region to be duplicated and the duplicated image region.

In step S104, the processor determines whether a person has been detected. When the processor determines that no person has been detected (NO in step S104), the process ends. When the processor determines that at least one person has been detected (YES in step S104), the process proceeds to step S105. In step S105, the processor sets N to an initial value of 0, sets the number of detected people to NMAX, and repeats the processes in step S106 to step S10 for each person by the number of identified people. Notably, the detected people undergo the processes in step S106 to step S110 in descending order according to the proportion of the rectangular area of each detected person.

In step S106, the processor causes the range setting unit 250 to set an object detection range based on the identified position of the person region. In this case, the detection frame (the position, or coordinates (px, py) and size (W, H)) for use in the person detection or face detection, as is may be set as the object detection range. Alternatively, a region including the detection frame and a predetermined margin is set as the object detection range.

Figure 8:
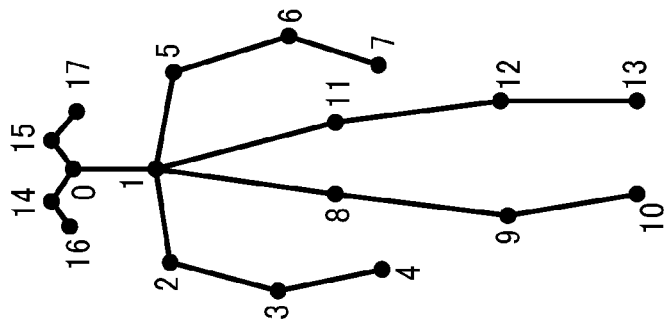
FIG. 8 is an illustration of a posture detection process performed by a spherical-image capturing apparatus according to a first embodiment.

In step S107, the processor causes the posture detection unit 260 to detect the state of the person, i.e., the posture of the person based on the object detection range within the image. The posture detection is performed on an image obtained by extracting an area corresponding to the coordinates of the set object detection range. For example, when the coordinates (px, py) are (3200, 460), the width W is 180, and the height H is 800, a rectangular range (the detection frame) of 800×180 at the coordinates ranging from (3200, 460) to (33800, 1260) is extracted. The posture detection unit 260 detects a skeletal frame from the extracted area, or image. Note that the skeletal-frame detection of the posture detection unit 260 may be performed not on the extracted image but only on the set object detection range. The skeletal-frame detection may be performed by a neural network learned by deep learning, and the coordinates of the body parts of a person are output with an image as an input. For example as illustrated in FIG. 8, the skeletal-frame detection is performed using 18 body parts 0 to 17 of a person. In this case, the position (x-coordinate value, y-coordinate value) of each body part is output. For example, the body parts No. 4 and No. 7 represent wrist positions, and the body parts No. 14 and No. 15 represent eye positions.

In step S108, the processor determines whether a predetermined posture has been detected by the posture detection unit 260. More specifically, in step S108, the processor determines whether a predetermined posture has been detected based on the coordinates (the skeletal-frame detection results) obtained by the skeletal-frame detection. Table 1 lists some examples of the relation between a predetermined posture and the camera control.

TABLE 1

| PRI-ORITY | POSTURE DETERMINATION CONDITIONS | CAMERA CONTROL |
|---|---|---|
| 1 | Y-COORDINATE VALUE OF NO. 4 | RELEASE THE |

TABLE 1-continued

| PRI-ORITY | POSTURE DETERMINATION CONDITIONS | CAMERA CONTROL |
|---|---|---|
| | OR NO. 7 IS ABOVE Y-COORDINATE VALUE OF NO. 14 OR NO. 16 | SHUTTER |
| 2 | Y-COORDINATE VALUE OF No. 4 OR No. 7 IS BELOW Y-COORDINATE VALUE OF NO. 9 OR NO. 12 | RELEASE THE SHUTTER AFTER 10 SEC. (TIMER FOR SHOOTING SET AFTER 10 SEC.) |
| 3 | Y-COORDINATE VALUE OF NO. 14 OR NO. 15 IS BELOW Y-COORDINATE VALUES OF NO. 8 AND NO. 11 | START CAPTURING A MOVING IMAGE |
| 4 | Y-COORDINATE VALUE OF NO. 9 OR NO. 12 IS BELOW Y-COORDINATE VALUES OF NO. 8 AND NO. 11 | END CAPTURING A MOVING IMAGE |

As listed in Table 1, on condition that the Y-coordinate value of the body part No. 4 (the right wrist) or No. 7 (the left wrist) of the detected skeletal frame is above the Y-coordinate value of the body part No. 14 (the right eye) or No. 15 (the left eye), the processor determines that the position of the wrist is above the position of the eye, and based on such a determination, further determines whether the detected skeletal frame is equivalent to a predetermined posture in step S108. In response to determining that the detected skeletal frame is equivalent to a predetermined posture (YES in S108), the processor releases the shutter (capture an image) (i.e., control the camera). When multiple postures are identified from the detected skeletal frame, the processor selects the highest-priority result from the multiple postures (the posture determination conditions in Table 1) according to the priority levels listed in Table 1. In an embodiment described below, a static posture is detected. However, no limitation is intended therein. Alternatively, the processor detects a dynamic change in posture, including a time-series of posture changes, before controlling the camera.

In response to determining that the detected skeletal frame is not equivalent to any predetermined posture (NO in step S108), the process proceeds to step S109. In step S109, the processor increments N by one. Then, the processor determines whether N has reached NMAX. When the processor determines that N has reached NMAX (YES in S109), the processor ends. When the processor determines that N has not reached NMAX yet (NO in S109), the process returns to step S106 to repeat the loop for the remaining detected person.

Returning to step S108 again, in response to determining that the detected skeletal frame is equivalent to a predetermined posture (YES in step S108), the process proceeds to step S11. In step S111, the processor causes the image-capturing control unit 270 to control the camera according to the posture determination condition listed in Table 1 and then ends the process for the frame. Releasing the shutter, for example, involves recording a captured image as a file.

The above-described embodiments achieve both a reduction in detection time and an increase in detection accuracy when detecting the posture of a person from within a screen. Particularly in the embodiments, the limited range for detecting an object to be detected is set. This enables detection of the posture of a person in the distance with higher accuracy and higher speed.

The following describes the image-capturing control based on the human-posture detection performed by the spherical-image capturing apparatus 10 according to the second embodiment, with reference to FIGS. 9 to 13A and 13B. In first embodiment described above, the processor adds a duplicated one end portion of a spherical image to the other end portion of the spherical image to generate a modified image, and, based on the modified image, identifies the position of the human region and detects the human posture at the process of detecting the human region and identifying the position of the human region. By contrast, in a second embodiment described below, the processor identifies the position of the human region and sets an object detection range according to the position and size of the person region before the process of duplicating an end portion and adding the duplicated end portion to the other end portion. In this case, the processor performs the process of duplicating an end portion and adding the duplicated end portion to the other end portion when needed, to detect the human posture.

Figure 9:
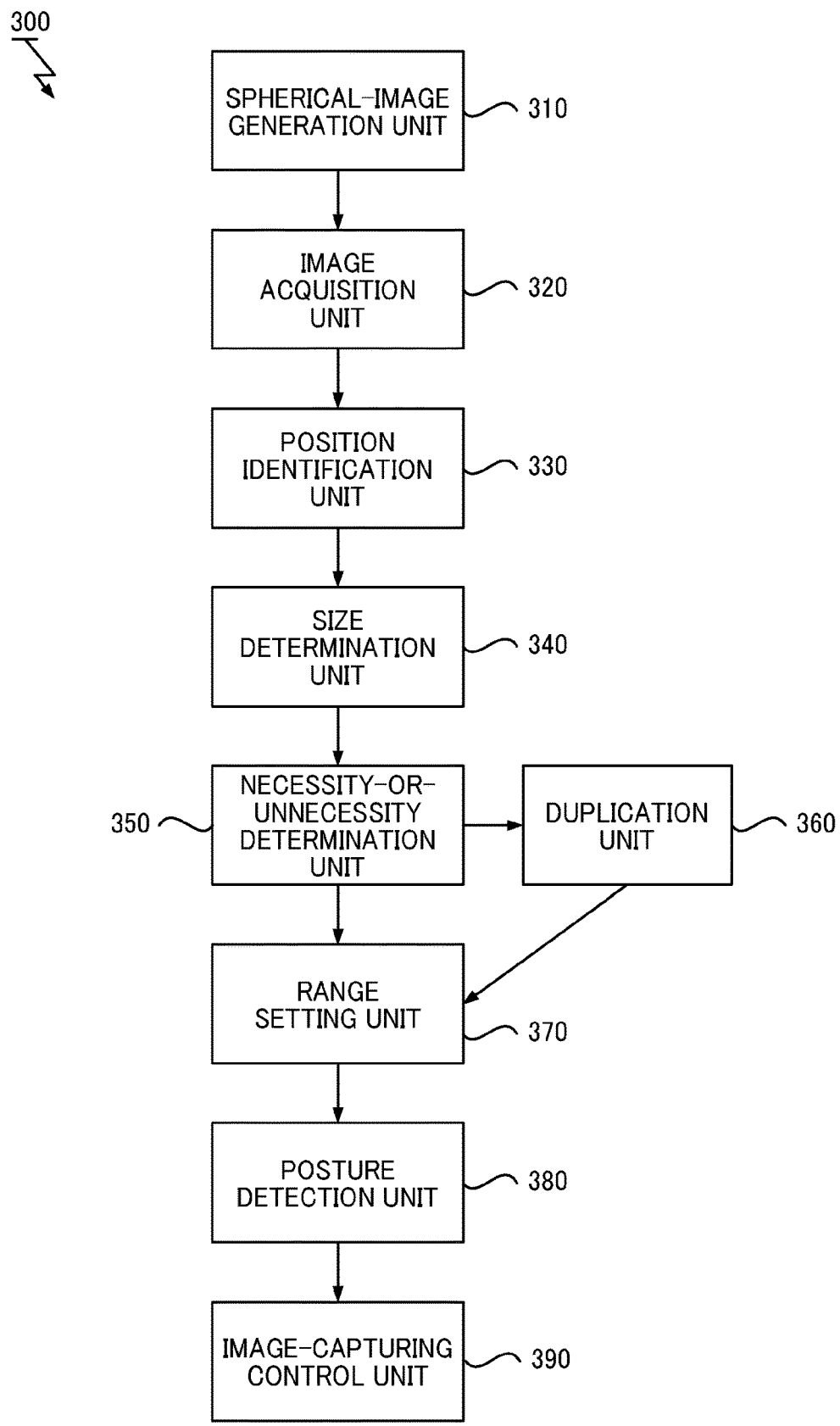
FIG. 9 is a block diagram of a functional configuration that implements image-capturing control based on human-posture detection, according to a second example embodiment.

FIG. 9 is a block diagram of a functional configuration that implements an image-capturing control based on the human-posture detection, according to a second example embodiment. The functional block 300 illustrated in FIG. 9 includes a spherical-image generation unit 310, an image acquisition unit 320, a position identification unit 330, a size determination unit 340, a necessity-or-unnecessity determination unit 350, a duplication unit 360, a range setting unit 370, a posture detection unit 380, and an image-capturing control unit 390. Unless otherwise specified, the functional blocks in FIG. 9 are assumed to have the same or similar functions as the functional blocks with the same names in FIG. 5, and detailed description thereof will be omitted.

The spherical-image generation unit 310 generates a spherical image by combining images captured by the image sensor 22 (the image sensors 22A and 22B), by the distortion correction and image combining block 118. Also in the present embodiment, fish-eye images are converted into a spherical image in a stage before the actual image capturing. The image acquisition unit 320 acquires an image to be processed.

The position identification unit 330 identifies the position of the person region from the acquired image. Any technique, including the lightweight person detection, the face detection, and the moving-object detection, is used to identify the position of a person region. In the second embodiment, the position specifying unit 330 identifies the position of the person region based on the original spherical image. For this reason, in the second embodiment, the position of the person region is detected by performing the moving-object detection based on a difference between multiple images of multiple frames continuously acquired. This is because a person region can be detected even from a part of a person when the person is positioned over the edges.

The size determination unit 340 determines the position and size of the object detection range to be set, based on the size of the identified person region. In this case, the object detection range is obtained by adding a predetermined margin to the detection frame (the position, or coordinates (px, py) and size (W, H)) for use in the moving-object detection.

The necessity-or-unnecessity determination unit 350 determines whether duplication is to be performed, based on the position and size of the object detection range to be set. The object detection range to be set might extend out of the range of the spherical image depending on the position and size of the object detection range. Based on the position and size of the object detection range to be set, the necessity-or-unnecessity determination unit 350 determines whether the object detection range extends out of the range of the spherical image. When the necessity-or-unnecessity determination unit 350 determines that the object detection range extends out of the range of the spherical image, the necessity-or-unnecessity determination unit 350 determines that duplication is to be performed.

To deal with such discontinuous end portions of the image, the duplication unit 360 according to an embodiment duplicates one end portion of the spherical image to allow the one end portion to be continuous with the other end portion of the spherical image, and further adds the duplicated portion to the other end portion. The duplication unit 360 according to the second embodiment performs duplication at a stage after the process of identifying the position of the person region by the position identification unit 330 as described above. However, the duplication unit 360 performs duplication only when the necessity-or-unnecessity determination unit 350 determines that duplication is to be performed.

The range setting unit 370 sets an object detection range with respect to a spherical image, based on the identified position of the person region. The object detection range set by the range setting unit 370 is a part of the spherical image. In some embodiments, the part of the spherical image undergoes the detection process. In some other embodiments, an image of a region corresponding to the object detection range set within the spherical image is duplicated for the detection process, and the duplicated image undergoes the detection process. For duplication of the image corresponding to the object detection range, which is for used in the detection process, such duplication is performed by adding a duplicated one end portion of the spherical image to the other end portion to generate a modified image, as the same in the first embodiment, and then duplicating an image corresponding to the object detection range from the modified image. Alternatively, after a portion of the spherical image included in the object detection range is separately duplicated (cut out), a process of duplicating a portion of another end portion of the spherical image, which corresponds only to a missing part of the object detection range, and adding the duplicated portion of another end portion to the object detection range is performed.

The posture detection unit 260 detects a posture of the person based on the image features of the object detection range in the spherical image. In this case, the object detection range set by the range setting unit 250 is subjected to the detection process. In this case, the object detection range is not reduced. Alternatively, even if trimming, white painting, black painting, or reduction is performed according to the input layer of the deep learning model used by the posture detection unit 260, the entire spherical image is not reduced but a limited object detection range, which is a part of the spherical image, is reduced, and thus a decrease in the number of pixels is prevented or reduced.

The image-capturing control unit 270 controls the imaging body 12 based on the posture of the person detected in the processes described above.

Figure 10:
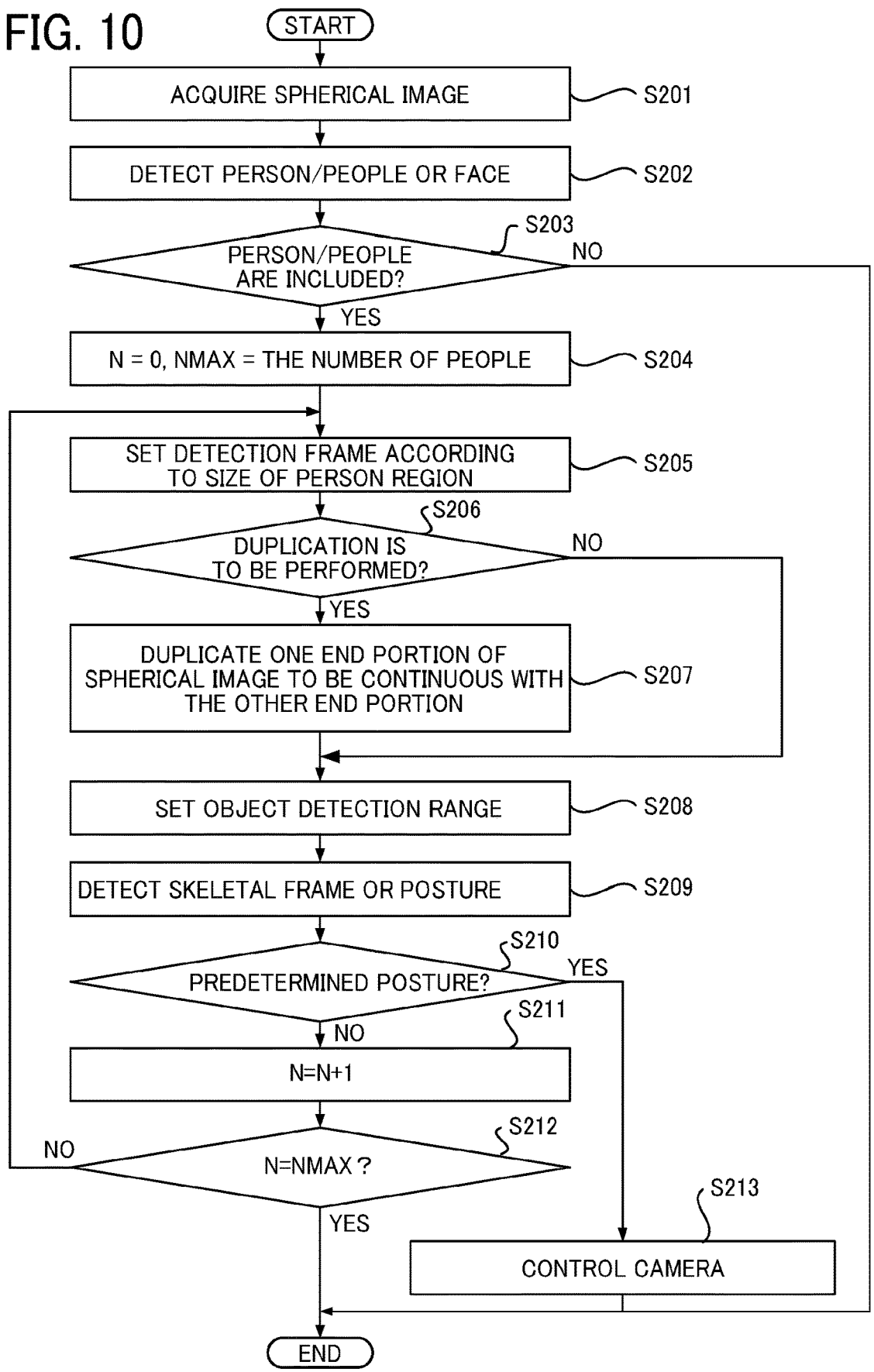
FIG. 10 is a flowchart of the image-capturing control based on the human-posture detection according to the second embodiment.

FIG. 10 is a flowchart of an image-capturing control based on the human-posture detection according to the second embodiment.

The processing in FIG. 10 is executed for each frame in response to startup of the spherical-image capturing apparatus 10 or startup of the image-capturing control capability based on the posture detection. As in the first embodiment, the processing in FIG. 10 may be performed for each frame, or may be performed at regular frame intervals.

In step S201, the processor causes the image acquisition unit 320 to acquire a spherical image for one frame generated by the spherical-image generation unit 310. In step S202, the processor causes the position identification unit 330 to identify the position and size of the person region based on the moving object detected from the spherical image.

Figure 11A:
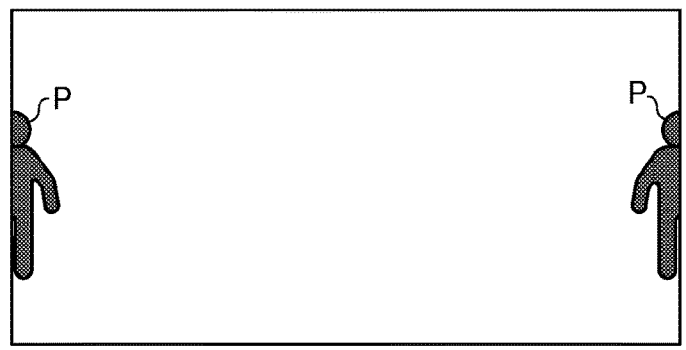
FIGS. 11A, 11B, and 11C are illustrations of a process of detecting a difference between frames and a process of determining whether duplication is to be performed, in the spherical-image capturing apparatus according to the second embodiment.
Figure 11B:
Figure 11C:
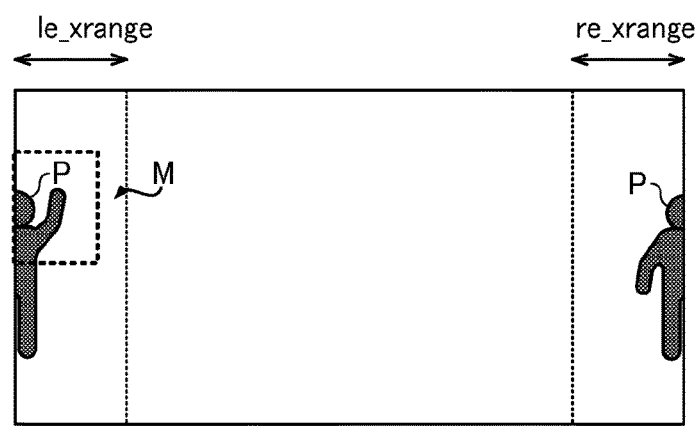

FIGS. 11A, 11B, and 11C are illustrations of a process of detecting a difference between frames and a process of determining whether duplication is to be performed, in the spherical-image capturing apparatus according to the second embodiment. FIGS. 11A and 11B are illustrations of two continuously captured frames. Using the difference between the previous frame and the current frame, the coordinates (px, py) and the size (height H, width W) of a moving object portion M, which is a rectangular area (the detection frame) as a person region including a person P, are output.

Referring back to FIG. 10, in step S203, the processor determines whether a person has been detected. When the processor determines that no person has been detected (NO in step S203), the process ends. When the processor determines that at least one person has been detected (YES in step S203), the process proceeds to step S204. In step S204, the processor sets N to an initial value of 0, sets the number of detected people (moving objects) to NMAX, and repeats the processes in step S205 to step S212 for each person by the number of identified people.

In steps S205 to 208, the processor sets the moving object portion as the person region, expands the detection frame according to the proportion of the person region (the detection frame is set according to the size of the person region in step S205), and sets the object detection range within the range of the detection frame (step S208). In this case, the processor duplicates one end portion of the spherical image and adds the duplicated end portion to the other end portion (step S207) as needed (whether duplication is to be performed is determined in step S206).

More specifically, in step S205, the processor causes the size determination unit 340 to determine the position and size of the object detection range to be set, based on the position and size of the identified person region.

Figure 12A:
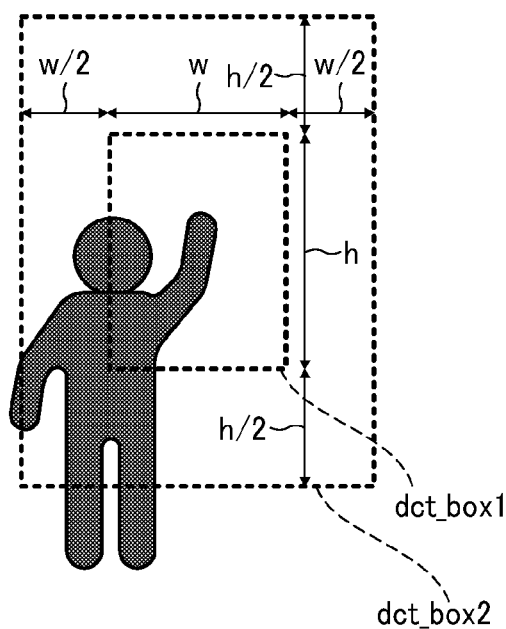
FIGS. 12A and 12B are illustrations of how to expand the range of an object to be detected (an object detection range), in the spherical-image capturing apparatus according to a second embodiment.
Figure 12B:
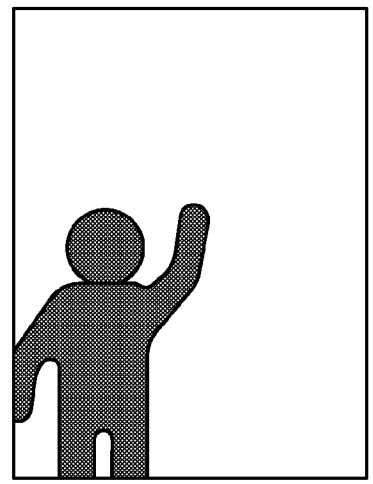

FIGS. 12A and 12B are illustrations of how to expand the range of an object to be detected (an object detection range), in the spherical-image capturing apparatus according to a second embodiment. In FIG. 12, the detection result of step S202 is assumed to be a detection frame dct_box2 of a height H and a width W. In this case, the range of the detection frame dct_box2 is set by expanding the width and height of the detection result (the detection frame dct_box1) by 50% (W/2) of the width W in both right and left directions and by 50% (H/2) of the height H in both up and down directions. Notably, when the extended height reaches the upper or lower end, the upper limit is limited to Y of 0 (Y=0) or the lower limit is limited to, for example, Y of 1920 (Y=1920).

In step S206, the processor determines whether duplication is to be performed based on the position and size of the object detection range (the object detection range may be a detection frame when the object detection range is of a fixed size to the detection frame). In at least one embodiment, the processor determines whether duplication is to be performed based on whether the object detection range lies off the edge of the image. Whether the object detection range lies off the edge of the image is determined based on the position and size of the object detection range determined according to the size of the region of the identified person (i.e., the person region) located at the end of a screen.

Specifically, the processor first determines whether the person region is located at an end of the screen. FIG. 11C is an illustration of a process of determining whether the person region is located at an end of the screen. As illustrated in FIG. 11C, boundary zones are set at the right and left ends of the spherical image to determine that the person region is located either end of the screen. The left boundary zone extends over the range le_xrange, and the right boundary zone extends over the range re_xrange in FIG. 11C. For boundary zones each occupying 10% of the horizontal dimension of an image of "3840×1920", each range le_xrange and re_xrange has a width of 384. In the above-described example, when the x-coordinate value of px or px+w is in a range of from 0 to le_xrange or from "1920−re_xrange" to 1920, the processor determines that the person region is located at either end of the screen. When the processor determines that the person region is located at an end of the screen, and the object detection range is determined according to the size of the person region, the processor determines whether duplication is to be performed based on whether the object detection range lies off the edge of the spherical image.

When the processor determines that duplication is to be performed (YES in step S206), the process proceeds to step S207. In step S207, the processor causes the duplication unit 360 to duplicate one end portion of the spherical image to allow the duplicated one end portion to be continuous with the other end portion of the spherical image in the object detection range, and add the duplicated one end portion to the other end portion of the spherical image so as to generate a modified image. In step S208, the processor sets an object detection range by the range setting unit 370.

For the separate duplication (cutout) of the image corresponding to the portion of the spherical image, a portion of the spherical image included in the object detection range is separately duplicated (cut out) before a portion of another end portion of the spherical image, which corresponds only to a missing part of the object detection range is duplicated, and then, the duplicated portion of another end portion is added to the object detection range. FIGS. 13A and 13B are illustrations of the process of duplicating a portion of the spherical image included in the object detection range, duplicating a portion of end portion of the spherical image, which corresponds only to a missing part of the object detection range, and adding a duplicated portion of another end portion to the object detection range.

In a case where the person region dct_box1 at the left end of the image is expanded by 50% in the vertical and horizontal directions as in FIGS. 13A and 13B, the left end of the person region extends off the edge of the image. For this reason, the range of a horizontal width of W/2−px and a vertical height of 2H, which corresponds to the area extending off the edge of the image, is duplicated, and the duplicated range is added to the trimmed region (i.e., the region dct_box2).

In step S209, the processor causes the posture detection unit 380 to detect the state of the person, i.e., the posture of the person based on the object detection range within the image. In step S210, the processor determines whether a predetermined posture has been detected by the posture detection unit 260. More specifically, in step S210, the processor determines whether a predetermined posture has been detected based on the coordinates (the skeletal-frame detection results) obtained by the skeletal-frame detection.

In response to determining that the detected skeletal frame is not equivalent to any predetermined posture (NO in step S210), the process proceeds to step S211. In step S211, the processor increments N by one. Then, the processor determines whether N has reached NMAX. When the processor determines that N has reached NMAX (YES in S109), the processor ends. When the processor determines that N has not reached NMAX yet (NO in S212), the process returns to step S205 to repeat the loop for the remaining detected person.

Returning to step S210 again, in response to determining that the detected skeletal frame is equivalent to a predetermined posture (YES in step S210), the process proceeds to step S213. In step S213, the processor performs camera control corresponding to the conditions illustrated in Table 1, for example, by the imaging control unit 390, and the processing for the frame ends in step S214. Releasing the shutter, for example, involves recording a captured image as a file.

Notably, in the second embodiment, the current frame is saved at the end of the posture detection processing, to use the saved current frame in detection of a moving object in the next frame.

The second embodiment achieves both a reduction in detection time and an increase in detection accuracy when detecting the state of a person from within a screen. Particularly in the embodiments, the limited range for detecting an object to be detected is set. This enables detection of the posture of a person in the distance with higher accuracy and higher speed. In the second embodiment, in particular, the end portion of the image is duplicated not for each frame, but when the range of the object to be detected lies over the boundary between the end portions of the images. The second embodiment is expected to reduce the processing time more significantly than the first embodiment.

The above-described embodiments achieve both a reduction in detection time and an increase in detection accuracy when detecting the state of a person from within a screen. In particular, the above-described embodiments allow a shorter detection time irrespective of whether the proportion of people is small within the screen. Such a configuration that allows a shorter detection time irrespective of whether the proportion of people is small within the screen enables a successful remote control of the image-capturing apparatus based on a specific posture of a person or a change in the posture.

In the above-described embodiments, an equirectangular image is described as a specific example. The above-described embodiment is suitably applicable in a case where an equirectangular image is used as an image used for detection because there is a portion unique to a spherical image, but is not particularly limited thereto. In other embodiments, the image to be processed is not limited to an equirectangular image. Further, in the above-described embodiments, the skeletal frames of people are used to detect the state of a person to be detected. However, no limitation is intended therein. In some other embodiments, instead of detecting the posture of a person from the whole body, a facial expression of a person (e.g., movement of the eyes and the mouth) and a state of a part of a person's body (sign using a hand) are detected.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The functional blocks as described above are implemented by a computer-executable program written by programming languages such as an assembler language, C, and object-oriented programming languages such as C++, C #, and Java (registered trademark). The program may be distributed through a telecommunication line or as being stored in a computer-executable storage medium such as a ROM, an electrically erasable and programmable read only memory (EEPROM), an electrically programmable read only memory (EPROM), a flash memory, a flexible disk, a compact disk read only memory (CD-ROM), a compact disk rewritable (CD-RW), a digital versatile disk read only memory (DVD-ROM), a digital versatile disk random access memory (DVD-RAM), a digital versatile disk rewritable (DVD-RW), a Blu-ray disk, an SD card, and a magneto-optical disk (MO).

Numerous additional modifications and variations are possible in light of the above teachings. It is therefore to be understood that, within the scope of the appended claims, the disclosure of this patent specification may be practiced otherwise than as specifically described herein.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

This patent application is based on and claims priority to Japanese Patent Application No. 2021-043464, filed on Mar. 17, 2021, in the Japan Patent Office, the entire disclosure of which is hereby incorporated by reference herein.

REFERENCE SIGNS LIST

10 Spherical-image capturing apparatus
12 Imaging body
14 Casing
18 Shutter button
20 Lens optical system
22 Image sensor
100 Processor
102 Lens barrel unit
108 ISP
110, 122 DMAC
112 Arbiter (ARBMEMC)
114 MEMC
116, 138 SDRAM
118 Distortion correction and image combination block
119 Face detection block
120 Motion sensor
124 Image processing block
126 Image data transferer
128 SDRAMC
130 CPU
132 Resizing block
134 Still-image compression block
136 Moving-image compression block
140 Memory card control block
142 Memory card slot
144 Flash ROM
146 USB block
148 USB connector
150 Peripheral block
152 Audio unit
154 Speaker
156 Microphone
158 Serial block
160 Wireless NIC
162 LCD driver
164 LCD monitor
166 Power switch
168 Bridge
200, 300 Function block
210, 310 Spherical-image generation unit
220, 320 Image acquisition unit
230, 360 Duplication unit
240, 330 Position identification unit
250, 370 Range setting unit
260, 380 Posture detection unit
260, 270, 390 Image-capturing control unit
340 Size determination unit
350 Necessity-or-unnecessity determination unit

The invention claimed is:

1. An image processing method comprising:
acquiring an image which is an equirectangular image, the image having a circular view in at least one direction;
identifying a position of a region of a person in the acquired image;
setting an object detection range based on the identified position of the region of the person;
detecting a state of the person based on the set object detection range; and
duplicating one end portion of the image, in at least the object detection range, to obtain a duplicated one end portion to allow the duplicated one end portion to be continuous with another end portion of the image, the duplicating including adding the duplicated one end portion to the another end portion to generate another image, the method further comprising:

determining position and size of the object detection range based on a size of the region of the person; and determining whether to perform the duplicating, based on the position and size of the object detection range, wherein based on determination that the duplicating is to be performed in the determining, the duplicating is performed after the identifying of the position of the region of the person, and wherein the detecting of the state of the person is performed based on the generated another image and based on the equirectangular image in which the one end portion has been duplicated and the object detection range.

2. The image processing method according to claim 1, wherein:

the duplicating is performed before the identifying of the position of the region of the person, and the identifying of the position of the region of the person is performed based on the generated another image.

3. The image processing method according to claim 1, wherein:

the image has an angle of view of 360 degrees at least a direction.

4. The image processing method according to claim 1, wherein:

the detecting of the state of the person includes detecting a skeletal frame of the person based on the image and detecting a posture of the person based on the detected skeletal frame.

5. The image processing method according to claim 1, wherein the identifying of the position of the region of the person involves one of:

detecting a person based on the image;

detecting a face based on the image; and obtaining a difference between images of multiple frames continuously captured and detecting a moving object based on the difference.

6. The image processing method according to claim 1, further comprising:

controlling the acquiring of the image based on the state of the person.

7. A non-transitory recording medium storing a computer-readable code for controlling a computer to carry out the method according to claim 1.

8. An image processing apparatus comprising:

an image acquisition circuitry configured to acquire an image which is an equirectangular image, the image having a view that circulates in at least one direction;

a position identification circuitry configured to identify a position of a region of a person in the image acquired by the image acquisition circuitry;

a range setting circuitry configured to set an object detection range based on the position of the region of the person, identified by the position identification circuitry;

a detection circuitry configured to detect a state of the person based on the object detection range set by the range setting circuitry;

duplication circuitry configured to duplicate one end portion of the image to obtain a duplicated one end portion, in at least the object detection range, to allow the duplicated one end portion to be continuous with another end portion of the image, the duplication circuitry further configured to add the duplicated one end portion to the another end portion to generate another image;

a size determination circuitry configured to determine position and size of the object detection range based on a size of the region of the person; and a necessity-or-unnecessity determination circuitry configured to determine whether to perform duplication by the duplication circuitry, based on the position and size of the object detection range, wherein based on determination of the necessity-or-unnecessity determination circuitry that duplication is to be performed by the duplication circuitry, the duplication circuitry performs the duplication, and wherein the detection circuitry detects the state of the person based on the generated another image.

9. The image processing apparatus according to claim 8, wherein the duplication circuitry performs the duplication before the identification of the position identification circuitry, and wherein the position identification circuitry identifies the position of the region of the person based on said another image generated by the duplication circuitry.

10. The image processing apparatus according to claim 8, wherein:

the image has an angle of view of 360 degrees at least a direction.

11. The image processing apparatus according to claim 8, wherein;

the detection circuitry detects a skeletal frame of the person based on the image and detects a posture of the person based on the detected skeletal frame.

12. An image-capturing apparatus comprising:

the image processing apparatus according to claim 8; and an image sensor to capture the image;

wherein the image processing apparatus further includes an image-capturing control circuitry configured to control the image sensor based on the state of the person detected by the image processing apparatus.

* * * * *